March 28, 1939.     H. SATTLER     2,152,214
MACHINE FOR APPLYING STICK HANDLES TO FROZEN CONFECTION BLOCKS
Filed Oct. 17, 1938     2 Sheets-Sheet 1
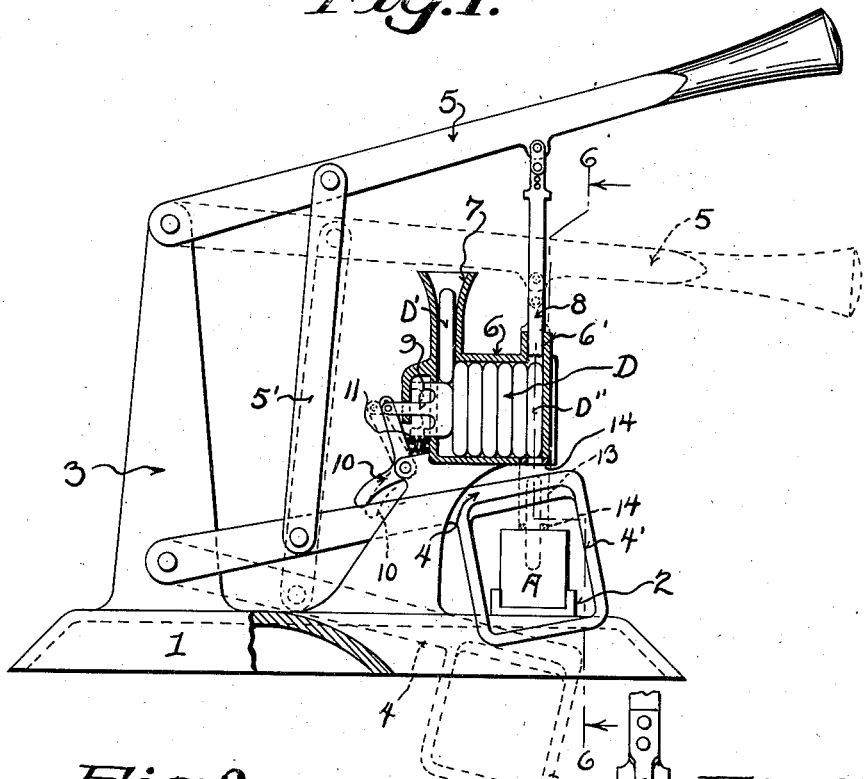
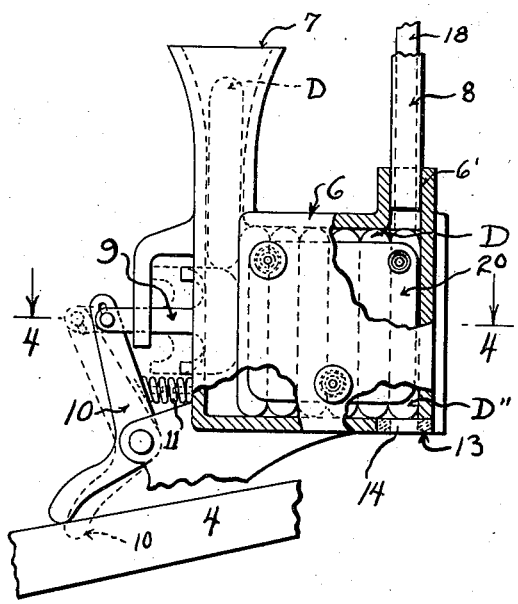
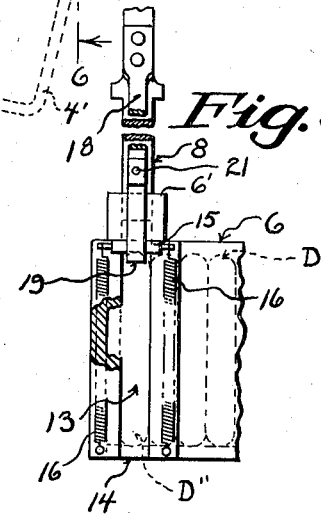
Inventor
Hans Sattler
By
Attorneys

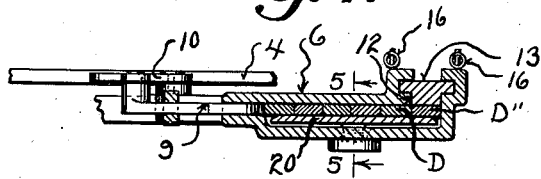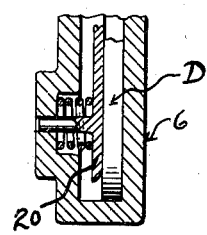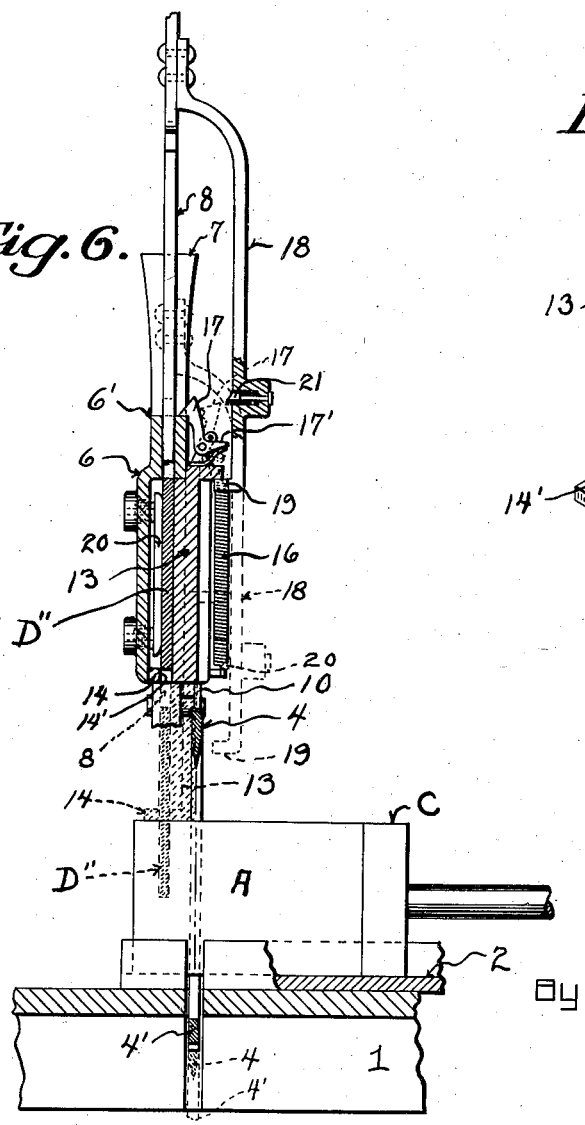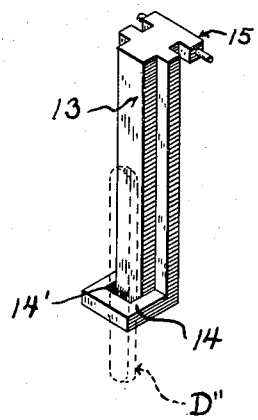

Patented Mar. 28, 1939

2,152,214

UNITED STATES PATENT OFFICE 2,152,214

MACHINE FOR APPLYING STICK HANDLES TO FROZEN CONFECTION BLOCKS

Hans Sattler, Sheboygan, Wis.

Application October 17, 1938, Serial No. 235,351

4 Claims. (Cl. 107—21)

My invention refers to machines for cutting frozen blocks of confection and fitting thereto sticks constituting handles for the blocks. Heretofore it has been common practice to feed the sticks to blocks, but under such conditions the sticks are not guided or controlled throughout their travel from a stick magazine to the confection block, resulting in many cases in the sticks piercing the block at an angle thereto whereby a defective product will result, or in the sticks piercing only a portion of the block, bearing in mind that said block, if a frozen confection, is more or less soft, and a handle placed at an angle may pierce two faces of the block, and frequently break away from the cube.

Therefore, the primary object of my invention is to maintain a constant guide for the stick from the magazine, to its finished embedded position within the confection block, thus insuring the stick piercing the block at a right angle thereto.

Other specific objects of my invention are:

To provide a reciprocative guide associated with the magazine, and adapted to travel with the stick and control the same, during the interval it is traveling and piercing the confection block;

To provide a stick guide adapted to simultaneously travel with the stick a predetermined distance, the guide then coming to rest upon the juxtaposed surface of the block, while the stick travels on, piercing the product in a correct position.

With the above and other objects in view, my invention consists in certain peculiarities of construction and arrangement of parts, as will be hereinafter fully set forth in connection with the accompanying drawings and subsequently claimed.

In the drawings:

Figure 1 represents a side elevation of a machine embodying the features of my invention, with parts broken away and other parts in section, to more clearly illustrate structural features.

Figure 2 is an enlarged detailed side elevation of the stick magazine and associated elements, with parts broken away and in section to more clearly illustrate structural features.

Figure 3 is a fragmentary side elevation of the magazine, showing particularly a reciprocative stick guide associated therewith.

Figure 4 is a cross section of the same, the section being indicated by line 4—4 of Figure 2.

Figure 5 is a magnified detailed view of a portion of the magazine, showing the spring-pressed tension wall for the sticks, the section being indicated by line 5—5 of Figure 4.

Figure 6 is an enlarged detailed sectional front view of the machine, the section being indicated by line 6—6 of Figure 1.

Figure 7 is a perspective view of the guide shoe illustrating the pad or foot thereof associated with a stick passing through the foot, as indicated in dotted lines.

Referring by characters to the drawings, the numeral 1 represents a base having a trough 2 for the reception of an ice cream column A, which column is intermittently fed forwardly by a follower C under suitable control, it being understood that this feeding of the ice cream column may be effected in various manners, not shown, as it forms no part of my present invention. The base 1 has extended from its face a bracket 3, and pivoted thereto is a reciprocative knife arm 4, terminating with a bail 4' which surrounds the ice cream column A.

The upper end of the bracket 3 has pivoted thereto an actuating handle lever 5, which handle is connected to the knife arm by a link 5'. It should be understood that this lever 5, while shown terminating with a handle, may be connected with a foot treadle, or other actuating mechanism, not shown.

The base 1 also carries a rectangular stick magazine 6, having a feed hopper 7 at its rear end, and a bottom opening at its forward lower end for discharging sticks D from the magazine, it being understood that a gang of these thin sticks are nested edge to edge, as shown. Alined with the stick discharge opening of the magazine is a bearing boss 6' for the reception of a reciprocative plunger 8, the upper end of said plunger being connected to the lever 5 by a link to compensate for arc movement of said lever. As shown, sticks may be fed to the feed hopper 7 in any desired manner, and the nested group of sticks contained within the magazine are fed forwardly to the discharge mouth thereof, and against the front wall, by a pusher-foot 9, which is reciprocatively mounted and actuated by a bell crank lever 10 that is pivoted to an ear extending from the magazine.

As shown in Figure 1 of the drawings, the pusher-foot has completed its forward feeding movement, due to its engagement with the knife arm 4, as said knife arm finishes its upward or idle stroke incidental to movement of the lever 5. When said lever is started upon its downwardly or working stroke, the knife arm disengages the bell crank lever 10, whereby said lever is shifted backwardly by a coil spring 11 so as to clear the channel for a stick D', which will then drop by gravity into the magazine, or said stick may be positively fed to its position of rest.

As best shown in Figures 3, 4, and 6, the front discharge end of the magazine is provided with a channel opening 12 for the reception of a reciprocative guide-shoe 13, the inner wall of which is alined with the associated back wall of said magazine. This guide-shoe terminates with a pad or foot 14 having an opening 14' therein, the said foot being under normal conditions in alinement with the bottom wall of the magazine, as best shown in Figure 1.

The reciprocative guide-shoe 13 terminates at its upper end with a projecting tongue 15, which is connected to a pair of pull springs 16, the lower ends of which are secured to pins extending from the magazine wall.

As best shown in Figure 6 of the drawings, when the guide shoe is in normal position of rest, it is held against downward movement by a spring-controlled pawl 17, which engages the top face of the bearing boss 6'. An offset leg 18 is secured to the plunger 8, with its lower end extended inwardly to form a tappet 19, which engages the shoe-guide tongue 15 and serves to lift said guide-shoe in its upward stroke, opposed by the coil springs.

It will be noted that the edge to edge nested sticks within the magazine are frictionally held against the juxtaposed face of the reciprocative guide-shoe 13. It will also be noted that the stick engaging wall of the guide shoe 13 may be knurled so as to more effectually maintain control of the stick.

From the foregoing description, it will be noted that when the hand lever 5 is actuated downwardly to complete its working stroke, as indicated in dotted lines, Figure 1, the mandrel or plunger 8 will have a slight idle downward movement, prior to its end engaging the end of the stick D''. At this instant, a spring-controlled tooth 21, carried by the leg 18, will engage the tail 17' of the dog 17 and thus release the guide-shoe from its positive locked position with relation to the magazine. Hence, the spring-controlled guide-shoe will now travel downwardly in synchrony with the plunger 8, which is feeding the stick D''. This synchronization will result, due to the fact that the tappet 19 of the shoe, throughout the remainder of the stroke, will be controlled against independent movement, because of the engagement of its tongue portion with said tappet.

It will now be apparent that the downward travel of the stick will be constantly under control due to its frictional engagement with the guide shoe, and also due to the fact that the lower end of said stick is now housed in the opening 14' of said guide-shoe. The simultaneous movement of these associated parts will thus hold the stick in its proper vertical alinement. When the pad or foot 14 comes to rest upon the upper face of the ice cream column, continuous downward movement of the plunger 8 will positively drive the stick into the ice cream, to its proper embedded position. Incidental to this movement the knife will sever a block of the confection, which will then be free from the column of ice cream A, and also will be free from the previously engaged parts, due to the fact that the actuating hand lever 5, and its associated leg 18, will lift to position of rest, and carry with it the guide shoe, whereby the parts will now assume the position as shown in Figure 6, preparatory to the next downward feeding of a stick.

It will be particularly understood that while I have shown a machine, and described the details minutely, it is to be understood that the generic principles involved in the operation of controlling a stick throughout its movement to a block of ice cream may be accomplished in various combinations of mechanical elements in addition to such elements as are shown in the drawings.

Changes in details may be made without departing from the spirit or the scope of the invention as defined by the claims.

I claim:
1. A stick handle feeder for frozen confection blocks comprising a magazine having a discharge throat, means for discharging sticks from the throat, a reciprocative guide shoe forming a wall of the magazine throat portion, a foot extending from the bottom of the shoe having a stick-receiving guide mouth, and means for feeding the stick and shoe to a face of the block followed by a further travel of said stick to pierce the block.

2. A stick handle feeder for ice cream blocks comprising a magazine having a discharge throat, means for discharging sticks from the throat, a reciprocative guide shoe forming a wall of the magazine throat portion, a foot extending from the bottom of the shoe having a stick-receiving guide mouth, and means for simultaneously feeding the stick and shoe to a face of the block followed by a further travel of said stick to pierce the block.

3. A stick handle feeder for ice cream blocks comprising a magazine having a discharge throat, means for discharging sticks from the throat, a reciprocative guide shoe forming a wall of the magazine throat portion, a foot extending from the bottom of the shoe having a stick-receiving guide mouth, means for simultaneously feeding the stick and shoe to a face of the block followed by a further travel of said stick to pierce the block, and means for severing the block from a column of the ice cream at the completion of the stick-engaging action.

4. A stick handle feeder for ice cream blocks comprising a magazine having a discharge throat, a reciprocative plunger mounted in the throat, a reciprocative guide-shoe carried by the magazine having an apertured pad through which the sticks are adapted to travel, and means for simultaneously causing the stick and associated guide-shoe to move downwardly to a point where the pad comes to rest upon the block following the further downward movement of the plunger to embed the stick within the block.

HANS SATTLER.